United States Patent [19]

Fournier

[11] Patent Number: 5,012,347
[45] Date of Patent: Apr. 30, 1991

[54] IMAGE STABILIZING APPARATUS FOR A PORTABLE VIDEO CAMERA

[76] Inventor: Antoine Fournier, 218 rue Félix-Faure, F-76620 Le Havre, France

[21] Appl. No.: 399,524
[22] PCT Filed: Jan. 22, 1988
[86] PCT No.: PCT/EP88/00045
 § 371 Date: Aug. 28, 1989
 § 102(e) Date: Aug. 28, 1989
[87] PCT Pub. No.: WO88/05623
 PCT Pub. Date: Jul. 28, 1988

[30] Foreign Application Priority Data
 Jan. 22, 1987 [FR] France ............... 87 00720

[51] Int. Cl.$^5$ ............... H04N 5/228; H04N 5/225; G02B 13/16; G03B 39/00
[52] U.S. Cl. .................. 358/222; 358/225; 354/70; 350/500
[58] Field of Search ............ 358/225, 222, 217; 33/318; 354/70; 350/500

[56] References Cited

U.S. PATENT DOCUMENTS 3,577,205 5/1971 Hobrough ..................... 354/70
3,619,500 11/1971 Bouley et al. .

FOREIGN PATENT DOCUMENTS 0149365 7/1985 European Pat. Off. .
200442 11/1986 European Pat. Off. .
59-55680 3/1984 Japan .
59-55681 3/1984 Japan .

Primary Examiner—James J. Groody
Assistant Examiner—Wendy R. Greening
Attorney, Agent, or Firm—Spencer & Frank

[57] ABSTRACT

The image stabilization apparatus for a portable video camera is such that for angular variations about the optical axis of the camera, the horizontal and vertical deflection currents Ix and Iy of the camera are converted as a function of these variations by an angular measurement device integrally connected with the camera prior to being applied to the corresponding horizontal and vertical deflection coils of the camera.

8 Claims, 3 Drawing Sheets

IMAGE STABILIZING APPARATUS FOR A PORTABLE VIDEO CAMERA

BACKGROUND OF THE INVENTION

The invention relates to an image stabilizing apparatus for a portable video camera.

With the advanced miniaturization of video cameras, these cameras are becoming lighter and lighter in weight and can be carried by hand. Hence it can happen that if an operator viewing a predetermined subject moves, a slight displacement of the image of the subject on the target plate of the camera occurs. This translates into a corresponding displacement of the image on the receiver, resulting in a blurred image on the screen.

SUMMARY OF THE INVENTION

The invention overcomes the above problem by creating an image stabilizer for a portable video camera such that angular variations in the axis of the camera do not affect the output signal of the camera; that is, they definitively do not affect the position of the image with respect to the screen of the receiver.

In accordance with the invention, the apparatus for stabilizing images for a portable video camera is characterized in that for an angular variation $\gamma$ about the optical axis of the camera, and for vertical deflection currents Iy and horizontal deflection currents Ix of the camera in the absence of stabilization, the deflection currents are converted and take the following form:

$$I1x = Ix \cos \gamma + Iy \sin \gamma$$

$$I1y = Iy \cos \gamma + Ix \sin \gamma$$

where I1x is the converted horizontal deflection current, and I1y is the converted vertical deflection current, which are applied respectively to the corresponding horizontal and vertical deflection coils of the camera.

In accordance with other characteristics of the invention, the converted signals can also take into account rotational movements about a horizontal axis and a vertical axis perpendicular to the axis of the objective, or lens. Various other characteristics of the invention will become more apparent from the ensuing detailed description of exemplary embodiments of the invention, taken in conjunction with the drawings. It is understood that these exemplary embodiments are not to be considered as limiting the scope of the invention.

DETAILED DESCRIPTION OF THE PREFERRED EMBODIMENTS

Figure 1:
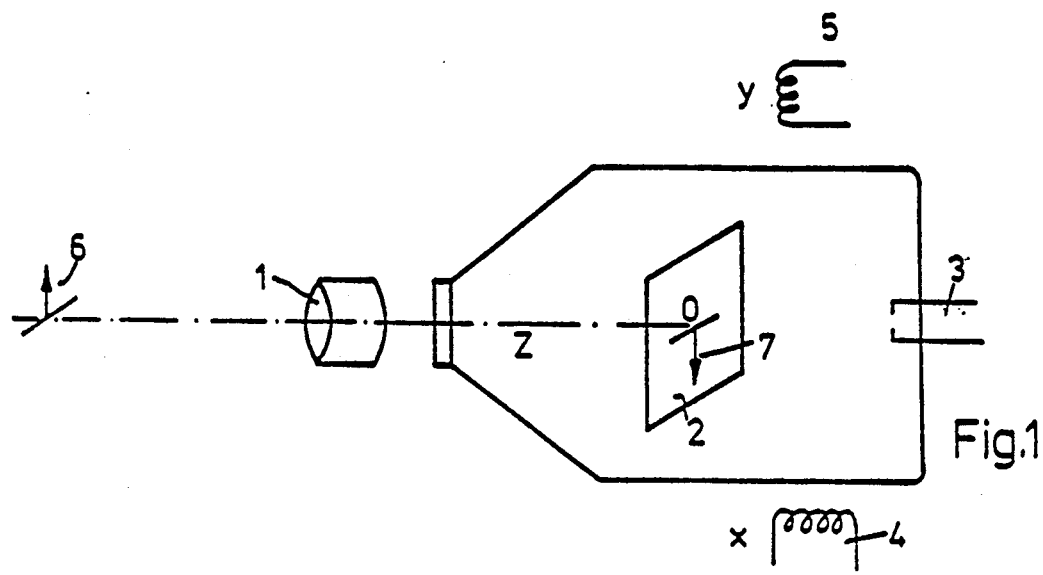
FIG. 1 is a schematic illustration of a portable video camera.

FIG. 1 schematically shows a portable video camera and its main components, for the sake of better comprehension of the invention.

Hence the video camera includes an objective or lens 1, a target plate 2, an electron gun 3, and horizontal deflection coils 4 for scanning in the x direction, and vertical deflection coils 5 for scanning in the y direction, although these coils may also be deflection plates.

As is well known, a subject 6 outside the camera forms an optical image 7 on the target plate 2 of a video camera, and this optical image 7 is scanned by the cathode reading system of the camera with the aid of an electron beam emitted by the electron gun 3, which is deflected horizontally and vertically by the deflection coils 4 and 5 having vertical and horizontal fields, respectively.

Figure 2:
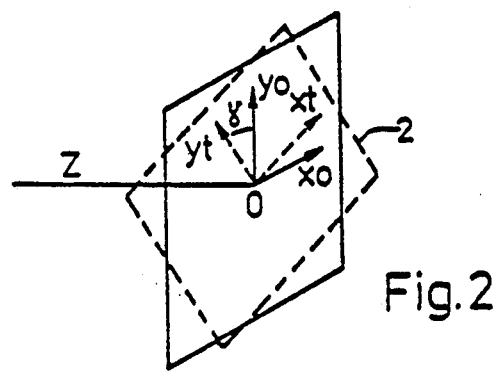
FIG. 2, on a larger scale, shows the target plate of the video camera of FIG. 1.

FIG. 2, in broken lines, shows the target plate 2 that has undergone a rotation about the optical axis OZ of the camera. It should be noted here that to obtain compensation for the displacements of the position of the image on the target plate, i.e., its stabilization, it is necessary that the target area should be greater than the area of the optical image projected on it by means of the objective or lens 1.

The position of the target plate 2 of the camera may be defined in Cartesian coordinates, using a system of axes, x, y and z.

First, let it be assumed that between a time O and a time t, the camera has undergone an angular variation about its optical axis OZ.

A point in the optical image 7 on the plate 2 is defined at time O by its coordinates $x_O$, $y_O$, z. When this point has rotated by the angle $\gamma$ about the axis OZ, it is then defined by $x_t$, $y_t$, z (z is unchanged).

In order that the angular variation $\gamma$ will have no effect at all upon the output signal of the camera, that is, will definitively not affect the position of the image with respect to the screen on the receiver, this angular variation must be compensated for and the cathode reading system of the camera must be made to rotate about the same angle $\gamma$.

Let Ix and Iy represent the currents that allow the vertical field and horizontal field of the deflection coils 4 and 5 to be created; in the absence of angular displacements of the camera, Ix, Iy are thus x and y scanning deflection currents for a camera lacking the image stabilization apparatus according to the invention.

In order to effect the required compensation described above, converted signals I1x and I1y must be sent through the coils 4 and 5, respectively, the values of these signals being as follows:

$$I1x = Ix \cos \gamma + Iy \sin \gamma$$

$$I1y = Iy \cos \gamma - Ix \sin \gamma$$

The signals Ix and Iy are generated by the camera, and the signals sin $\gamma$ and cos $\gamma$ can be generated by a sine and cosine converter associated with a rate gyroscope integrally connected with the camera and placed in such a manner that it provides a measure of the angular velocity of the camera about the axis of its objective. The entire apparatus thus functions as a vibration or oscillation damper for an elastically suspended camera.

Figure 3:
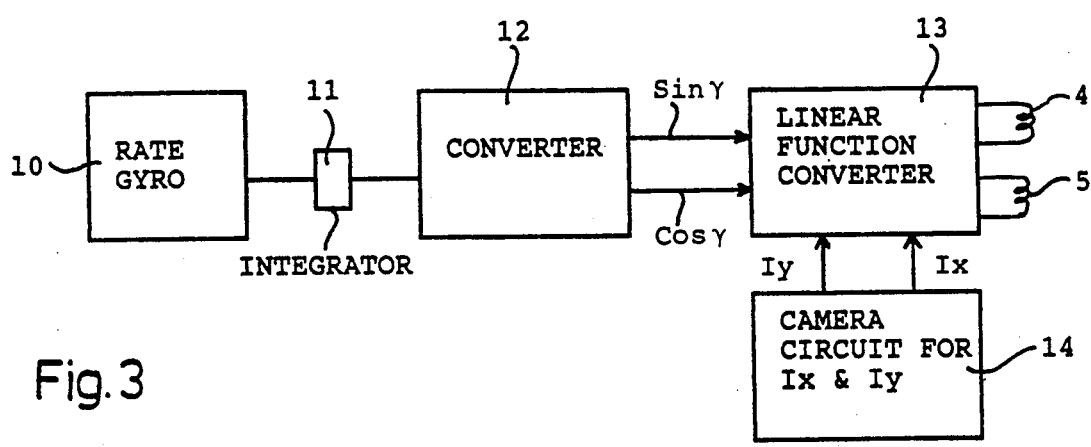
FIG. 3 is a block diagram of an embodiment of the image stabilizer according to the invention.

In FIG. 3, which shows a block diagram of the apparatus, a rate gyro or gyroscope 10 has been shown, which is integrally connected to the camera of FIG. 1 and is located in such a manner that it provides a measure of the angular velocity of the camera about the axis OZ of its objective 1. The rate gyroscope 10 is connected at the output to an integrator 11 provided with a slow return to zero or discharge rate, so as to convert the angular velocity into an angle for rapid movements. This integrator 11 is connected to a converter 12 of sine and cosine functions, which in turn is connected to a linear function converter circuit 13.

At its output, the converter 12 thus furnishes two values, sin γ and cos γ, which are proportional to the sine and cosine of the angles of inclination of the camera with respect to its prior position, for rapid angular variations, and furnishes an increasingly reduced fraction of these functions when the angular velocity decreases. The sine and cosine converters mentioned above can be replaced by converters operating upon the angle measured by the gyroscopic device to obtain polynomials or power series (Taylor) thereof respectively corresponding to these functions, which may use, in a first approximation, the first-order (linear) member only. If more precision is desired, higher-order polynomials may be used.

The linear function circuit 13 is connected to the output of the circuit of the camera that furnishes the signals Ix and Iy, this circuit being shown at 14. The linear function circuit 13 comprises a multiplier and adder circuit suitable for performing multiplications and additions of signals, so that the above-mentioned converted signals I1x and I1y can be obtained. Multiplications and additions in this manner of signals generated on the one hand by the camera circuit 14, relating to Ix and Iy, and on the other hand by the rate gyroscope 10, the integrator 11 and the converter 12 relating to γ, are very easily performed in real time by analog or numerical circuits of a known type. It has been assumed above that the camera is angularly displaced about the optical axis OZ of its objective.

Let it now be supposed that the camera is displaced about an axis perpendicular to the optical axis of the camera, for example about the axis x of FIG. 2, which is in the horizontal plane.

Any rotational movement α about the axis x is translated into a displacement of the optical image 7 in the direction y, which is proportional to the angle α (small α). In order to prevent such a rapid displacement of the optical image 7 from being translated into a corresponding displacement of the electronic image at the receiver, a direct current proportional to α must be added to the vertical scanning current Iy. Thus the cathode ray corresponding to a point is made to coincide with this point independently of the aforementioned rotational movement.

The converted signal thus assumes the following value:

$$Iiy = Iy + K1\alpha$$

An identical induction for a rate gyroscope, with which, after integration, angular varations β about the y axis of FIG. 2 can be obtained, demonstrates that the converted signal is then as follows:

$$Iix = Ix + K2\beta$$

The use of such a converted signal is not generally necessary, because the shocks to which the cameras are subjected as they move are seldom diminished by movements about the y axis that displace the image in the x direction proportional to the angle β.

Figure 4:
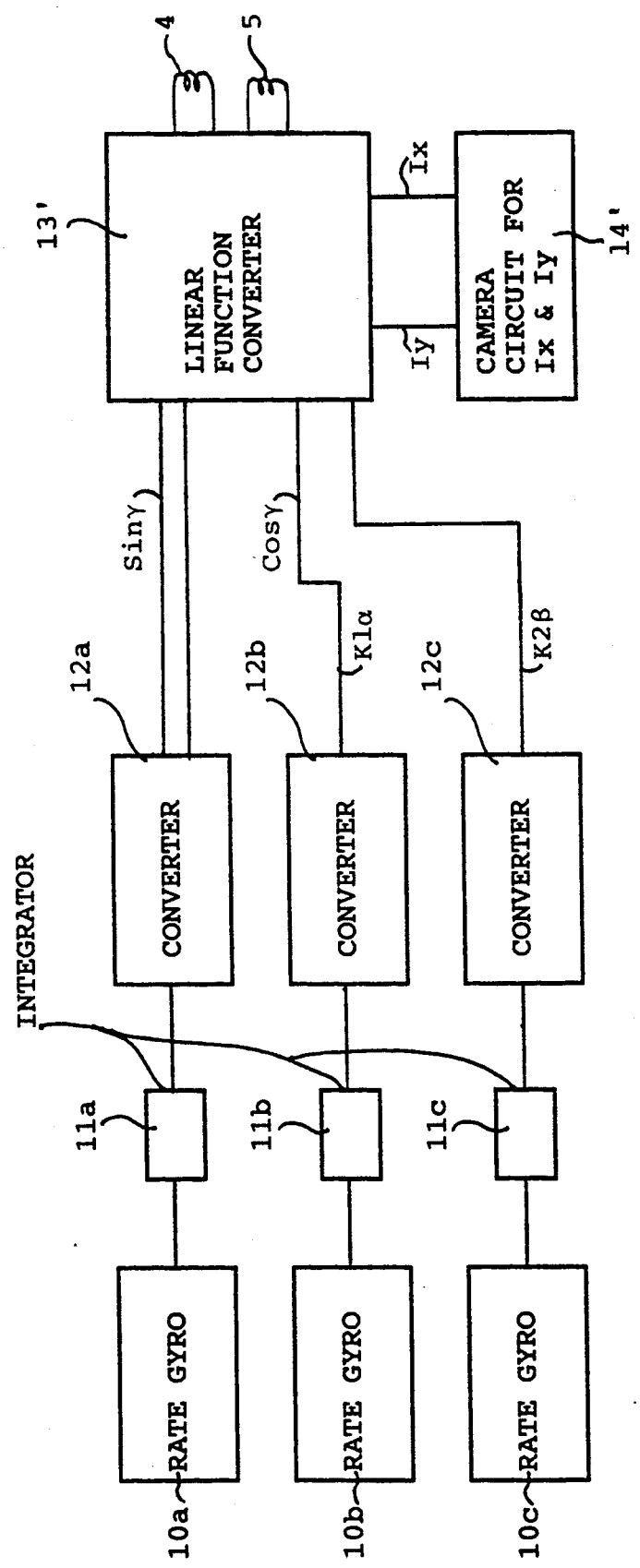
FIG. 4 is a block diagram of another embodiment of image stabilizer according to the invention.

FIG. 4 shows the entire stabilization apparatus for arbitrary angular variations of the camera making use of the aforementioned provisions.

Any angular variation of the camera is defined in polar coordinates by the angles α, β and γ above, so that the apparatus thus includes three rate gyroscopes 10a, 10b, 10c similar to the rate gyroscope 10 of FIG. 2, which are provided in order to furnish information corresponding to the angular variations γ, α and β, respectively.

The coefficients K1 and K2 multiplying the angles by which the camera pivots about a horizontal and vertical axis, respectively, both of which are perpendicular to the optical axis OZ, depend on the distance for which the objective focuses the image of the subject onto the photosensitive surface of the target plate, because this determines the displacement of the optical image in the target plane. If a zoom lens, which is capable of varying the focal length of the objective, is used, the coefficients K1 and K2 are made variable as a function thereof. In order to obtain this, the zoom lens, which is controlled by rotation about the optical axis, is mechanically coupled (by gears or a belt and pulleys) to the wiper shaft of a potentiometer whose resistive path is connected between the terminals of a DC power supply, in order to deliver a voltage that is variable with the adjustment of the zoom lens. If the variations in the focusing of the zoom lens are nonlinear with the angle of rotation of its control device, the resistor of the potentiometer can be made to follow this nonlinear function. It is also possible to connect two such potentiometers, connected in the manner of rheostats, into the feedback path of two operational amplifiers, which respectively amplify the signals given by the two further gyroscopic devices (cascaded rate gyroscopes and integrators), in order to vary the respective gains of these amplifiers.

The various rate gyroscopes 10a, 10b, 10c are connected to respective integrators 11a, 11b, 11c, which in turn are connected to respective converters 12a, 12b, 12c. The converter 12a is a sine and cosine function converter, while the converters 12b and 12c respectively furnish a direct current K1α and K2β proportional to the angular variation detected by the corresponding gyroscope. A linear function circuit 13', which receives the signals Ix and Iy from a circuit 14' that is identical to the circuit 14 of FIG. 3, is connected to the output of the converters 12a, 12b and 12c. The linear function circuit 13' thus furnishes at its output signals that are the linear functions of Ix, Iy, sin γ, cos γ, α and β as defined above. These signals are applied to the deflection coils 4 and 5 of FIG. 1 and can be written as follows:

$$I2x = Ix \cos \gamma + Iy \sin \gamma + K2\beta$$

$$I2y = Iy \cos \gamma - Ix \sin \gamma + K1\alpha$$

In the case where the deflection via a coil is replaced with a static deflection, the same induction must naturally be applied, in order to proceed to the linear operations described above on the voltages applied to the deflection plates.

It should be noted that in the entire foregoing description, the dimensions of the image 7 furnished by the objective 1 and the target plate 2 of the camera must be such that the above values of the converted signals remain within the boundaries of the target plate.

Moreover, a switch located on the camera makes it possible to prevent functioning of the stabilization apparatus except when this is deemed useful.

Figure 5:
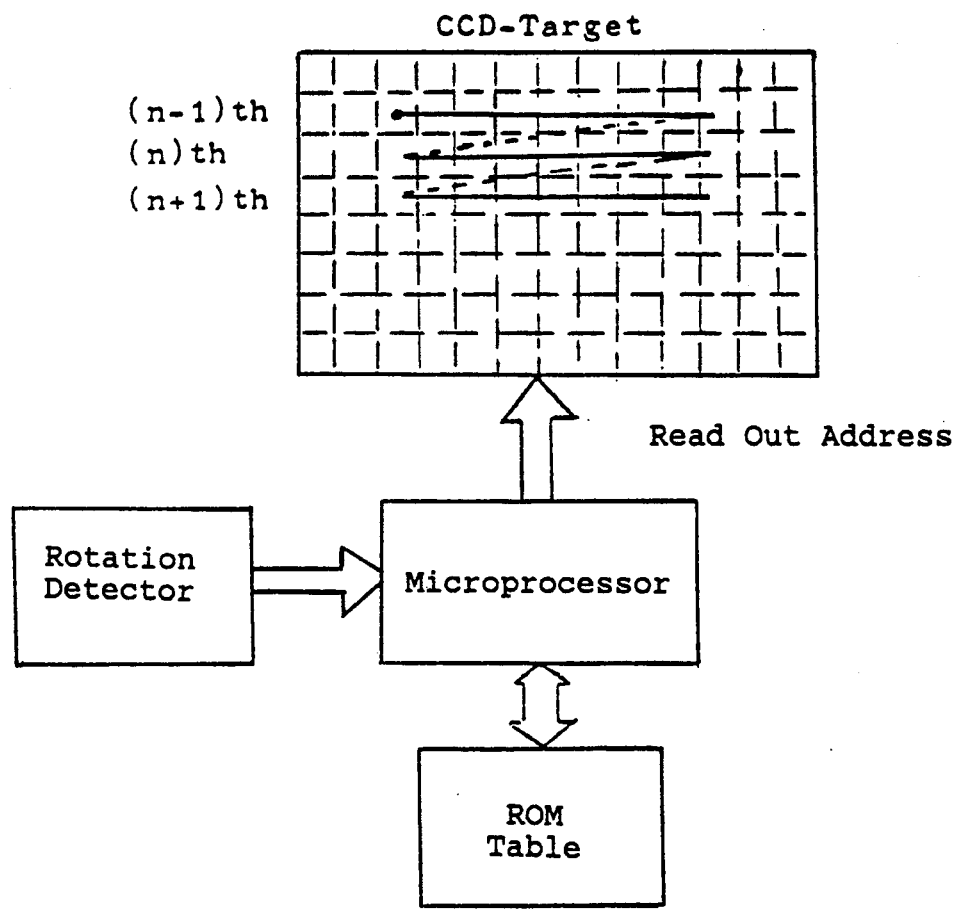
FIG. 5 is a block diagram of a further embodiment of an image stabilizer according to the invention.

If the camera uses a charge-coupled device solid-state picture sensor, shown in FIG. 5, the scanning is carried out in a matrix fashion, using a digital computer or microprocessors. The linear vertical and horizontal deflection of the scanned image field or of the starting point of the scan are relatively simple operations on the addresses of the read-out points. However, the rotation of the image about the optical axis of the camera is a more complex operation, because in order to obtain a line, several rows of the CCD elements have to be read consecutively. As a matter of fact, depending on the value of the angle of rotation ($\gamma$) a certain number of successive elements of the nth row will have to be read, then the same number of elements of the (n+1)th and so on, until the end of each line. Thereafter, the following (n+1)th or (n+2)th row (if the scan is interlaced) is read in the same manner as before, by passing from one row to the next. If the rotation is in the opposite direction, the elements of the nth row are followed by the (n−1)th and then by the (n−2)th, and so on. An adequate algorithm can be stored in a read-only memory associated with a microprocessor, to carry out the desired shift in the address of the read-out. The shift functions will correspond substantially to the sine and cosine of the angle of rotation.

The present disclosure relates to the subject matter disclosed in French Application No. 87/00720 of Jan. 22, 1987, the entire specification of which is incorporated herein by reference.

It will be understood that the above description of the present invention is susceptible to various modifications, changes and adaptations, and the same are intended to be comprehended within the meaning and range of equivalents of the dependent claims.

What is claimed is:

1. An image stabilization apparatus for a portable video camera comprising: lens means, having an optical axis z, for projecting an image onto a plane extending in x and y directions perpendicular to said optical axis z; photosensitive means, responsive to x and y direction scanning signals, for analyzing said image along x and y axes; electrical means for supplying said x and y direction scanning signals; and at least one measuring means for supplying signal values to said electrical means to control said x and y direction scanning signals, said at least one measuring means including gyrometric means for sensing the angular velocity of the camera body about one of said x, y and z axes and producing a corresponding output value, and integrator means, responsive to said output value from said gyrometric means, for deriving an angle of rotation value from said angular velocity value and for feeding said angle of rotation value to said electrical means to control said x and y scanning signals, said integrator means supplying an integrated output value of said angular velocity value for rapid movements of said camera body and providing a slow automatic return to zero of its output value when said angular velocity value is low.

2. An image stabilization apparatus for a portable video camera as defined in claim 1 wherein: said measuring means is responsive to angular variations $\gamma$ about said optical axis z of the camera; said electrical means normally provides x and y scanning signals Ix and Iy respectively to the corresponding horizontal and vertical deflection means of the camera in the absence of stabilization; and said electrical means is responsive to said output values from said integrator means to provide x and y scanning signals I1x and I1y, respectively where $$I1x = Ix \cos \gamma + Iy \sin \gamma, \text{ and}$$

$$I1y = Iy \cos \gamma + Ix \sin \gamma.$$

3. An image stabilization apparatus for a portable video camera as defined in claim 1 wherein said measuring means is responsive angular variations $\alpha$ about a horizontal said x axis; said electrical means normally provides a y scanning signal Iy to the vertical deflection means of the camera in the absence of stabilization; and said electrical means is responsive to said output values from said integrator means to provide a y scanning signal Iiy where Iiy=Iy+k1$\alpha$, and K1 is a coefficient dependent on the focal length of said lens means.

4. An image stabilization apparatus for a portable video camera as defined in claim 1 wherein said measuring means is responsive to angular variations $\beta$ about a vertical said y axis: said electrical measuring means normally provides a said x scanning signal Ix to the horizontal deflection means of the camera in the absence of stabilization; and said electrical means is responsive to said output values of said integrator means to provide an x scanning signal Iix, where Iix=Ix+K2$\beta$, and wherein K2 is a coefficient dependent on the focal length of said lens means.

5. An image stabilization apparatus for a portable video camera as defined in claim 2 wherein: said measuring means is further responsive to angular variations $\alpha$ about a horizontal said x axis and angular variation $\beta$ about a vertical said y axis, and thus to arbitrary angular variations of the camera; and said electrical means is responsive to said output values from said integrator means to provide x and y scanning signals I2x and I2y respectively where $$I2x = Ix \cos \gamma + Iy \sin \gamma + K2\beta = I1x + 2K\beta,$$

$$I2y = Iy \cos \gamma + Ix \sin \gamma + K1\alpha = I1y + 2K\alpha, \text{ and}$$

wherein K1$\alpha$ and K2$\beta$ are coefficients dependent on the focal length of said lens means.

6. An image stabilization apparatus for a portable video camera as defined in claim 5 including a respective said measuring means, each including a respective one of said gyrometric means connected to a respective one of said integrator means, for each of said x, y and z axes.

7. An image stabilization apparatus for a portable video camera as defined in claim 6 wherein each said gyrometric means is a rate gyro.

8. An image stabilization apparatus for a portable video camera as defined in claim 2 wherein: said gyrometric means is a rate gyro; and said electrical means includes converter means for converting said output values from said integrator means to respective sine and cosine values and linear function circuit means for combining said sine and cosine values with said signals Ix and Iy to provide said signals I1x and I1y.

* * * * *